US010132094B1

(12) United States Patent
Gneckow, Jr.

(10) Patent No.: US 10,132,094 B1
(45) Date of Patent: Nov. 20, 2018

(54) CARPET PULLING APPARATUS

(71) Applicant: Elwood Gneckow, Jr., Royal Oak, MI (US)

(72) Inventor: Elwood Gneckow, Jr., Royal Oak, MI (US)

(*) Notice: Subject to any disclaimer, the term of this patent is extended or adjusted under 35 U.S.C. 154(b) by 0 days.

(21) Appl. No.: 15/596,539

(22) Filed: May 16, 2017

(51) Int. Cl.
| | | |
|---|---|---|
| B32B 38/10 | (2006.01) | |
| E04G 23/00 | (2006.01) | |
| B66D 1/60 | (2006.01) | |
| B66D 1/28 | (2006.01) | |
| B32B 43/00 | (2006.01) | |
| B66D 1/12 | (2006.01) | |

(52) U.S. Cl.
CPC .......... *E04G 23/006* (2013.01); *B32B 43/006* (2013.01); *B66D 1/12* (2013.01); *B66D 1/28* (2013.01); *B66D 1/60* (2013.01); *B32B 2419/00* (2013.01); *Y10S 156/929* (2013.01); *Y10S 156/94* (2013.01); *Y10T 156/1168* (2015.01); *Y10T 156/1978* (2015.01)

(58) Field of Classification Search
CPC .......... E04G 23/006; B66D 1/12; B66D 1/60; Y10S 156/929; Y10S 156/94; Y10T 156/1168; Y10T 156/1978
See application file for complete search history.

(56) References Cited

U.S. PATENT DOCUMENTS

| 126,818 A | 5/1872 | Lindsay |
| 4,332,371 A | 6/1982 | Bell |
| 4,533,118 A | 8/1985 | Thomas |
| 5,348,608 A * | 9/1994 | Glenn ............... A47G 27/0487 156/717 |
| 5,456,794 A * | 10/1995 | Barrett .............. A47G 27/0487 156/714 |
| 6,613,188 B1 * | 9/2003 | Berg ..................... E04G 23/006 156/715 |
| 7,032,886 B1 | 4/2006 | Kraft |
| 7,384,498 B2 | 6/2008 | Rannikko |
| 7,959,760 B1 | 6/2011 | Galbraith |

* cited by examiner

*Primary Examiner* — Mark A Osele
(74) *Attorney, Agent, or Firm* — Wayne State Law School Patent Clinic

(57) ABSTRACT

A carpet pulling apparatus includes a base including a top surface and a bottom surface opposite the top surface. The bottom surface includes a plurality of spikes. A winch is attached to the top surface of the base. A cable extends from a first end to a second end. The first end is received by the winch. A clamp is attached to the second end of the cable. A diverter is configured to receive the cable at a location between the first end and the second end and divert a direction of extension of the cable. The diverter is capable of being moved relative to the base.

18 Claims, 7 Drawing Sheets

CARPET PULLING APPARATUS

BACKGROUND

During a carpet removal job, it can be time-consuming and laborious for a human to remove carpet without the aid of tools or machinery. Carpets are often secured to a flooring via some sort of adhesive, for example, glue. To separate and remove the carpet from the floor, a bond created by the adhesive must be broken. A winch may be used to pull back the carpet, thus breaking the bond and separating the carpet from the floor.

A winch, cable and clamp connection is used to pull carpet as an alternative to humans pulling carpet by hand. By using this winch, cable and clamp connection, the physical motion of pulling the carpet, and, thus, breaking the bond between the carpet and the flooring, is done by the winch as opposed to the human. There may be a variety of obstructions in a room, for example, support beams, pipes, etc., which may interfere with a direction of extension of the cable from the winch to the clamp. This interference may prohibit the carpet from being pulled in a straight line. Therefore, a movable diverting mechanism may be used to divert the direction in which the cable is pulling the carpet. This allows the position of the winch to be maintained, while the diverting mechanism is relocated to avoid the obstruction, which increases the speed and efficiency of the carpet removal job.

SUMMARY

Figure 1:
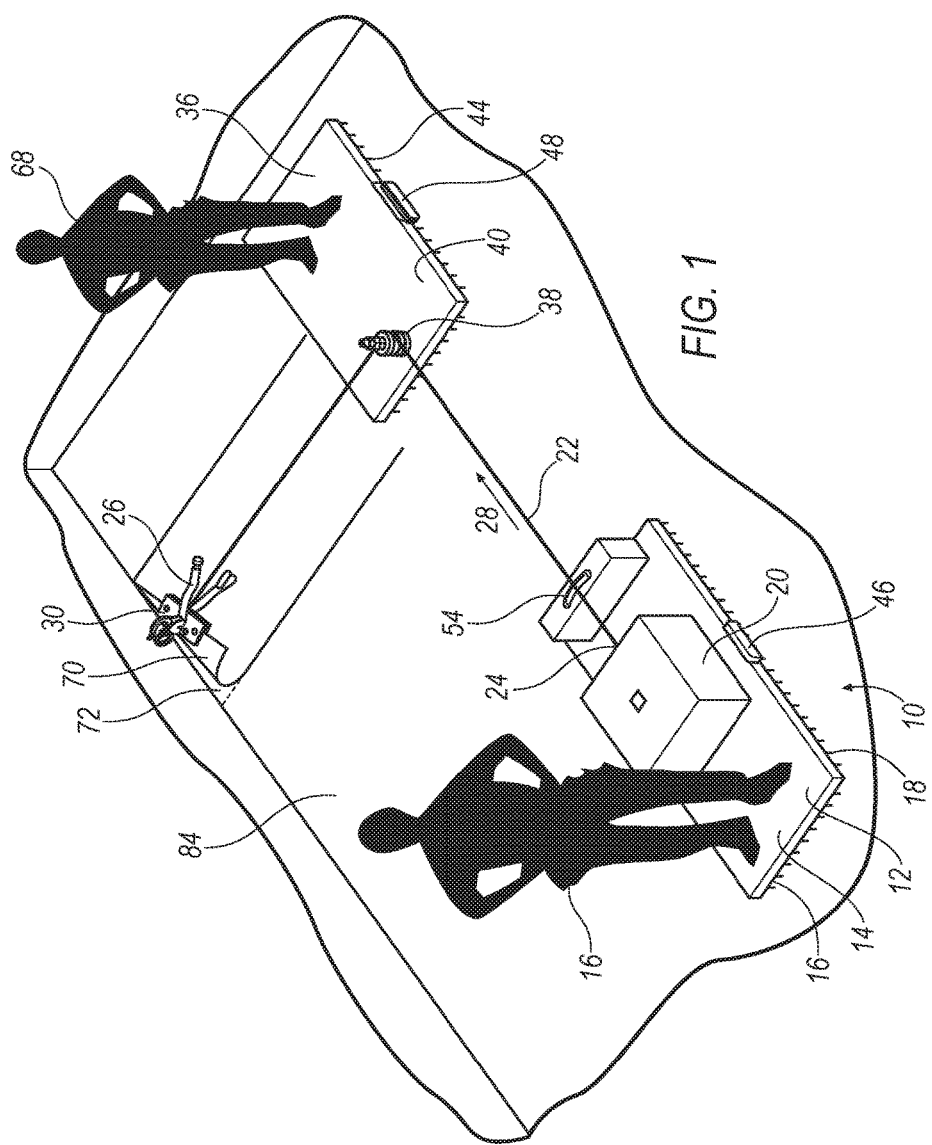
FIG. 1 is a perspective view of a carpet pulling apparatus.
Figure 2:
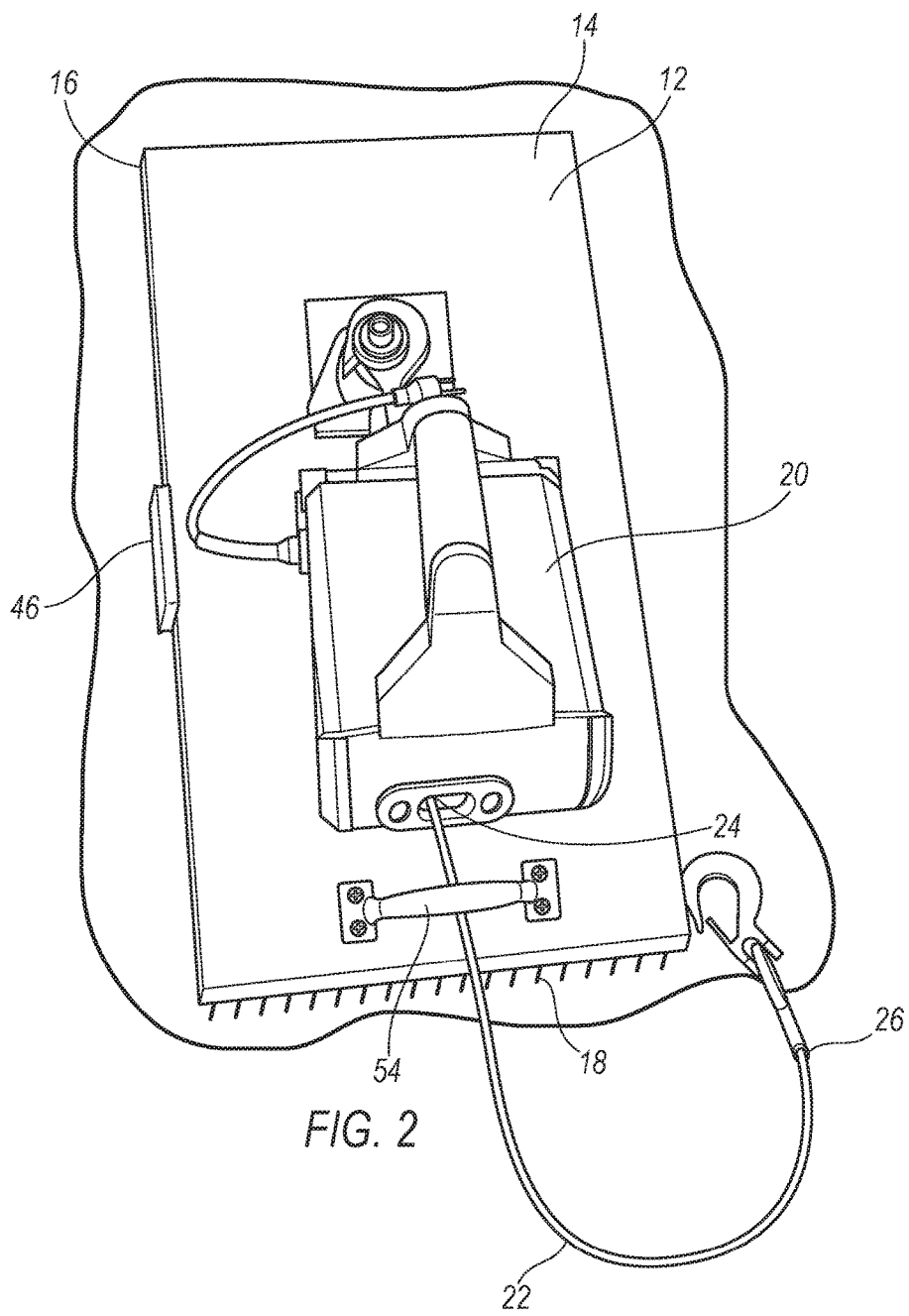
FIG. 2 is a perspective view of a base of the carpet pulling apparatus.
Figure 3:
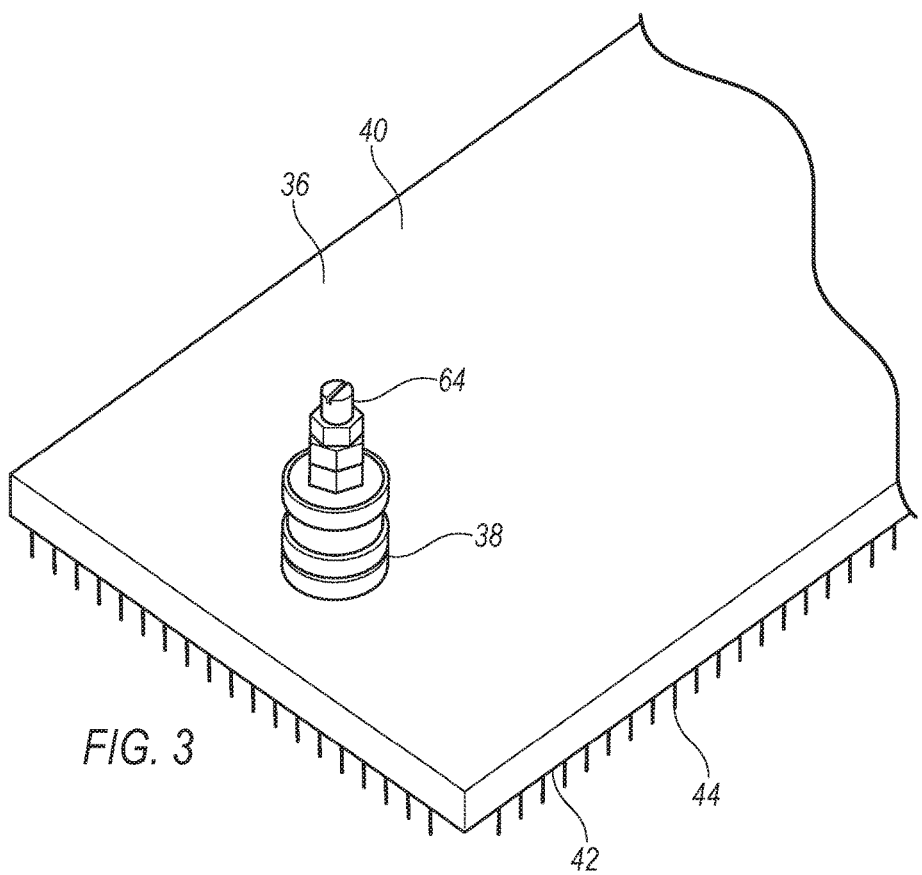
FIG. 3 is a perspective view of a diverter of the carpet pulling apparatus.

A carpet pulling apparatus including a base including a top surface and a bottom surface opposite the top surface. The carpet pulling apparatus includes a winch attached to the top surface of the base. The carpet pulling apparatus includes a cable extending from a first end to a second end, the first end being received by the winch. The carpet pulling apparatus includes a clamp attached to the second end of the cable. The carpet pulling apparatus includes a diverter configured to receive the cable at a location between the first end and the second end and divert a direction of extension of the cable, the diverter being capable of being moved relative to the base.

The diverter may include a diverting pulley configured to receive the cable.

The diverter may include a top surface and a bottom surface opposite the top surface, the diverting pulley attaching to the top surface and the bottom surface including a plurality of spikes.

The top surface of the diverter may be capable of receiving an operator.

The top surface of the base may be capable of receiving an operator.

The bottom surface of the base may include a plurality of spikes.

The clamp may be movable between an unlocked position and a locked position.

The clamp may include a gripping mechanism configured to grip a strip of carpet.

The base may include a first latching mechanism and the diverter includes a second latching mechanism, the first latching mechanism and the second latching mechanism being engageable with each other.

A carpet pulling apparatus includes a base including a top surface and a bottom surface opposite the top surface. The carpet pulling apparatus includes a winch attached to the top surface of the base. The carpet pulling apparatus includes a cable extending from a first end to a second end, the first end being received by the winch. The carpet pulling apparatus includes a pulley attached to the second end of the cable. The carpet pulling apparatus includes a second cable extending from a first end to a second end, the second cable engaging the pulley at a location between the first end and the second end of the second cable. The carpet pulling apparatus includes a clamp attached to the first end of the second cable. The carpet pulling apparatus includes a second clamp attached to the second end of the second cable.

The carpet pulling apparatus may include a diverter configured to receive the cable at a location between the first end and the second end of the cable and divert a direction of extension of the cable.

The diverter may be capable of being moved relative to the base.

The diverter may include a diverting pulley configured to receive the cable.

The diverter may include a top surface and a bottom surface opposite the top surface, the diverting pulley attaching to the top surface and the bottom surface including a plurality of spikes.

The top surface of the diverter may be capable of receiving an operator.

The base may include a first latching mechanism and the diverter includes a second latching mechanism, the first latching mechanism and the second latching mechanism being engageable with each other.

The top surface of the base may be capable of receiving an operator.

The bottom surface of the base may include a plurality of spikes.

The clamp and the second clamp may each be movable between an unlocked position and a locked position.

A method of removing carpet from a floor includes placing a base on a carpet surface. The method includes placing a diverter on the carpet surface at a location spaced from the base. The method includes extending a cable from a winch attached to the base. The method includes engaging the cable with a diverting pulley attached to the diverter. The method includes securing a clamp attached to the cable with a strip of carpet. The method includes pulling the cable towards the base by powering on the winch.

DETAILED DESCRIPTION

With reference to the Figures, wherein like numerals indicate like parts throughout the several views, a carpet pulling apparatus 10 is generally shown. The carpet pulling apparatus 10 includes a base 12 including a top surface 14 and a bottom surface 16 opposite the top surface 14. The bottom surface 16 includes a plurality of spikes 18. A winch 20 is attached to the top surface 14 of the base 12. A cable 22 extends from a first end 24 to a second end 26. The first end 24 is received by the winch 20. A clamp 30 is attached to the second end 26 of the cable 22. A diverter 36 is configured to receive the cable 22 at a location between the first end 24 and the second end 26 and divert a direction of extension 28 of the cable 22. The diverter 36 is capable of being moved relative to the base 12.

As set forth above, the carpet pulling apparatus 10 includes the base 12 including the top surface 14 and the bottom surface 16 opposite the top surface 14. The base 12 may be, for example, wood, metal, plastic, or any other suitable material. The base 12 may have a generally rectangular shape, as shown in FIG. 1. Alternatively, the base 12 may have any suitable shape. The top surface 14 of the base 12 may be capable of receiving an operator 68, as shown in FIG. 1. The top surface 14 may be generally flat, thus, allowing the operator 68 to, for example, stand, kneel, etc., on the top surface 14. Alternatively, the top surface 14 may be configured in any suitable manner.

The bottom surface 16 includes the plurality of spikes 18. The spikes 18 may be, for example, nails, screws, teeth, etc. The spikes 18 may be equally spaced from each other, randomly spaced from each other, or have any other suitable configuration. The bottom surface 16 may be generally flat. Alternatively, the bottom surface 16 may be configured in any suitable manner.

As shown in FIG. 1, the winch 20 is attached to the top surface 14 of the base 12. The winch 20 may be attached to the top surface 14 via fasteners, such as bolts, screws, glue, etc. Alternatively, the winch 20 may be integrally formed with the base 12. The winch 20 may be any suitable type of winch, for example, a snubbing winch, a wakeskate winch, etc. The winch 20 may include a motor (not shown) and a drum (not shown). The motor rotates the drum, and allows the cable 22 to either wrap around the drum or to release from the drum, depending on a direction of rotation. The motor may be electric, gas-powered, hand-powered via a crank, etc. With respect to the base 12, the drum may be vertical, horizontal, or any other suitable configuration.

As set forth above, the cable 22 extends from the first end 24 to the second end 26. The cable 22 may be any suitable material, for example, steel, hemp, nylon, etc. The first end 24 is received by the winch 20, for example, the first end 24 may be received by the drum. The cable 22 has a direction of extension 28. The direction of extension 28 is the direction in which the cable 22 extends from the winch 20, when the cable 22 is taut.

A guide 54 may be attached to the top surface 14 of the base 12. A portion of the cable 22 may be disposed between the guide 54 and the top surface 14 of the base 12. For example, a portion of the cable 22 may traverse the guide 54 when the cable 22 is taut. The guide 54 may have a generally arched shape, or any other suitable shape. The guide 54 may be any suitable material, for example, steel, wood, brass, etc. The guide 54 may help to align the direction of extension 28, and the guide 54 may help the winch 20 to receive the first end 24 of the cable 22. The guide 54 may prohibit excessive lateral and vertical movement of the cable 22.

As set forth above, the clamp 30 is attached to the second end 26 of the cable 22. For example, the clamp 30 may be attached to the second end 26 of the cable 22 by a hook, a fastener, or any other suitable connection. Alternatively, the clamp 30 may be integrally formed with the cable 22.

Figure 5:
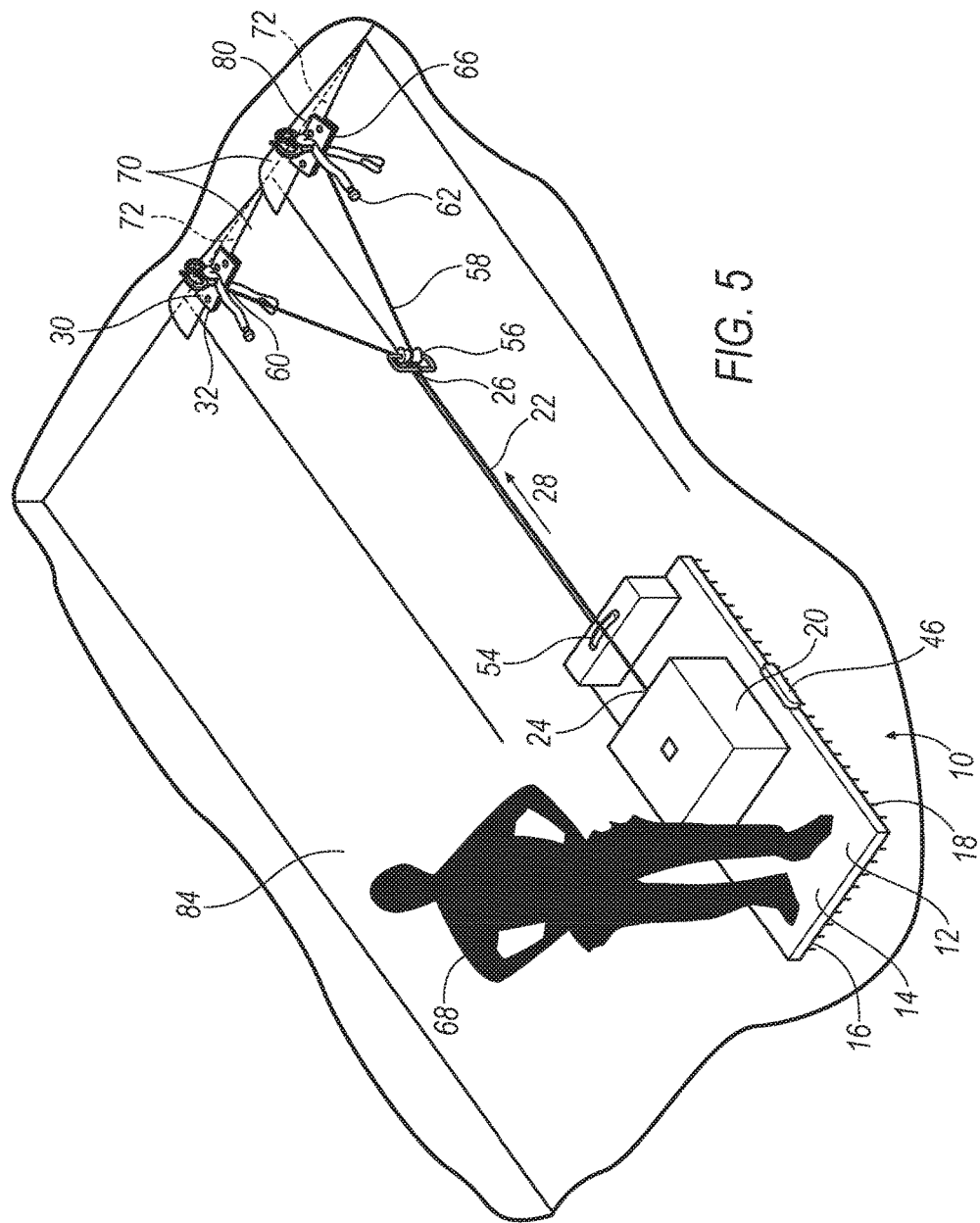
FIG. 5 is a perspective view of the carpet pulling apparatus with a diverting pulley.
Figure 6:
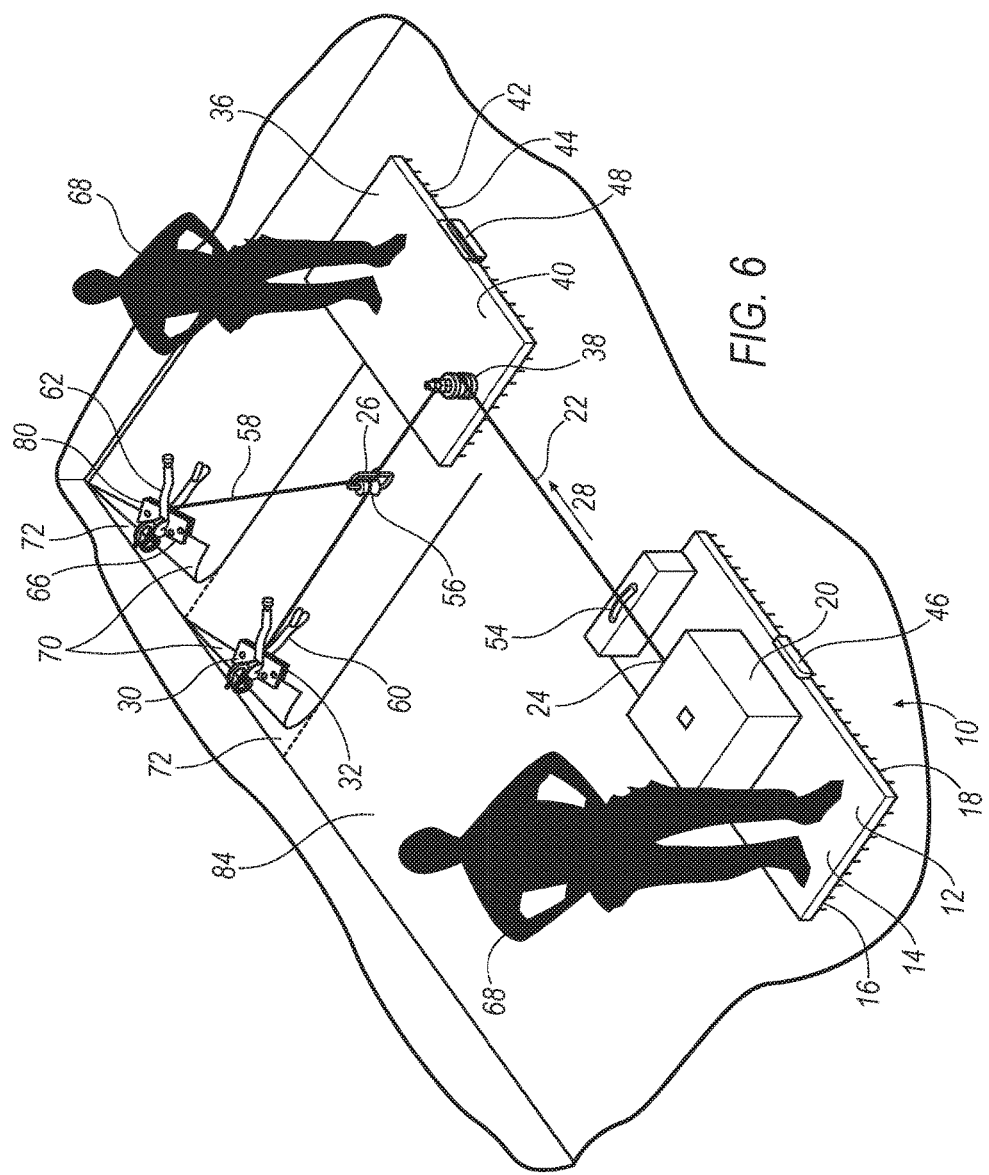
FIG. 6 is a perspective view of the carpet pulling apparatus with the diverting pulley and the diverter.

As another example, a pulley 56 may be attached to the second end 26 of the cable 22, as shown in FIGS. 5 and 6. The pulley 56 may be attached to a bracket 78, and the bracket 78 may be attached to the second end 26 of the cable 22. The pulley 56 may rotate about a generally vertical axis. The pulley 56 may be plastic, metal, or any other suitable material.

The carpet pulling apparatus may include a second cable 58 extending from a first end 60 to a second end 62. The second cable 58 may engage the pulley 56 at a location between the first end 60 and the second end 62 of the second cable 58. The second cable 58 may be any suitable material, for example, steel, hemp, nylon, etc.

The clamp 30 may be attached to the first end 60 of the second cable 58, and a second clamp 66 may be attached to the second end 62 of the second cable 58. For example, the clamp 30 may be attached to the first end 60 of the second cable 58 by a hook, a fastener, or any other suitable connection. Alternatively, the clamp 30 may be integrally formed with the second cable 58. For example, the second clamp 66 may be attached to the second end 62 of the second cable 58 by a hook, a fastener, or any other suitable connection. Alternatively, the second clamp 66 may be integrally formed with the second cable 58.

Figure 4A:
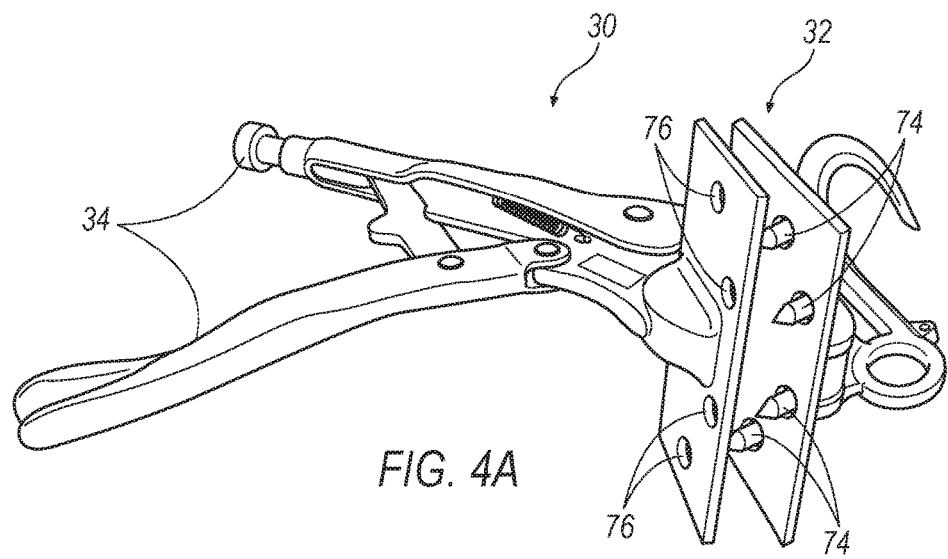
FIG. 4A is a perspective view of a clamp in an unlocked position.
Figure 4B:
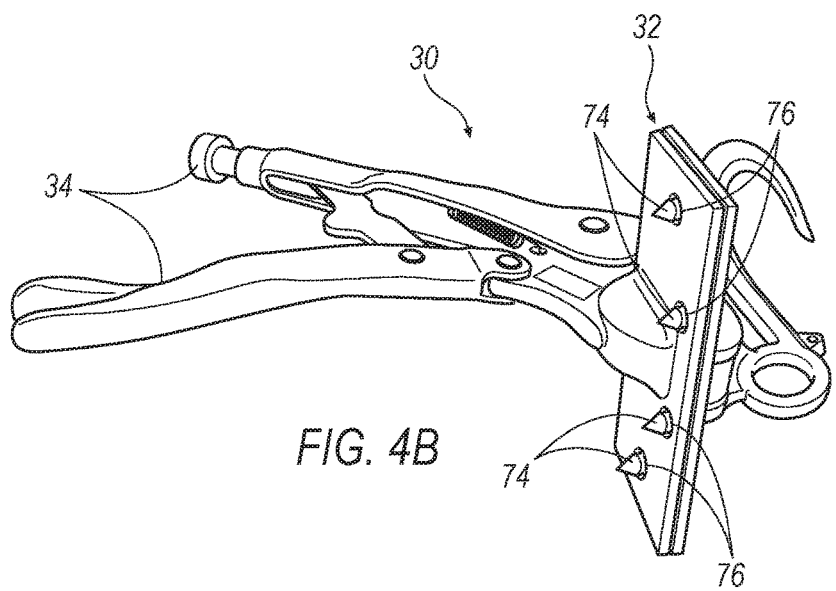
FIG. 4B is a perspective view of the clamp in a locked position.

The clamp 30 may include a gripping mechanism 32 configured to grip a strip of carpet 70, and the second clamp 66 may include a gripping mechanism 80 configured to grip the strip of carpet 70. As shown in FIGS. 4A-4B, the gripping mechanism 32 may include teeth 74 and holes 76 configured to receive the teeth 74 to grip the strip of carpet 70. Alternatively, the gripping mechanism 32 may grip the strip of carpet 70 in any suitable manner. The gripping mechanism 80 of the second clamp 66 may be substantially similar to, or different than the gripping mechanism 32 of the clamp 30.

The clamp 30 and the second clamp 66 may each be movable between an unlocked position, as shown in FIG. 4A, and a locked position, as shown in FIG. 4B. The clamp 30 may include a handle 34 configured to allow the operator 68 to move the clamp 30 between the unlocked position and the locked position. The handle 34 may be attached to the second end 26 of the cable. Alternatively, any suitable part of the clamp 30 may be attached to the second end 26 of the cable. The clamp 30 may move between the unlocked position and the locked position without any external fasteners, e.g., the clamp 30 may move between the unlocked position and the locked position similar to a pair of vice grip pliers. Alternatively, the clamp 30 may move between the unlocked position and the locked position in any suitable manner. The second clamp 66 may move between the unlocked position and the locked position in a substantially similar manner to, or different than how the clamp 30 moves between the unlocked position and the locked position. The clamp 30 and the second clamp 66 may move between the unlocked position and the locked position independently of each other.

As set forth above, the diverter 36 is configured to receive the cable 22 at a location between the first end 24 and the second end 26 and divert the direction of extension 28 of the cable 22. The diverter 36 may have a generally rectangular shape, as shown in FIG. 1. Alternatively, the diverter 36 may have any suitable shape. The diverter 36 may include a diverting pulley 38 configured to receive the cable 22. For example, the diverting pulley 38 may divert the direction of extension 28 of the cable 22. The diverting pulley 38 may divert the direction of extension 28 of the cable 22 by any suitable magnitude, for example, by 90 degrees as shown in FIG. 1. The diverting pulley 38 may rotate about a rod 64. The rod 64 may be generally vertical, and may be fixed, i.e., unable to rotate, to the diverter 36. The diverting pulley 38 may be plastic, metal, or any other suitable material.

The diverter 36 may include a top surface 40 and a bottom surface 42 opposite the top surface 40. The top surface 40 of the diverter 36 may be capable of receiving an operator 68, as shown in FIG. 1. The top surface 40 and the bottom surface 42 may be generally flat, thus, allowing the operator 68 to, for example, stand, kneel, etc., on the top surface 40. Alternatively, the top surface 40 may be configured in any suitable manner.

The diverting pulley 38 may attach to the top surface 40. For example, the rod 64 may attach to the top surface 40. Alternatively, the diverting pulley 38 may be attached to the top surface 40 in any suitable manner.

The bottom surface 42 may include a plurality of spikes 44. The spikes 44 may be, for example, nails, screws, teeth, etc. The spikes 18 may be equally spaced from each other, randomly spaced from each other, or have any other suitable configuration. The bottom surface 42 may be generally flat. The bottom surface 42 and the spikes 44 of the diverter 36 may be configured similarly to the bottom surface 16 and the spikes 18 of the base 12. Alternatively, the bottom surface 42 and the spikes 44 may be configured in any suitable manner.

The diverter 36 is capable of being moved relative to the base 12, i.e., the diverter 36 is not fixed to a floor 72. For example, there may be a distance between the base 12 and the diverter 36 along the floor 72. The distance between the base 12 and the diverter 36 along the floor 72 may be increased or decreased by physically moving the diverter 36.

Figure 7:
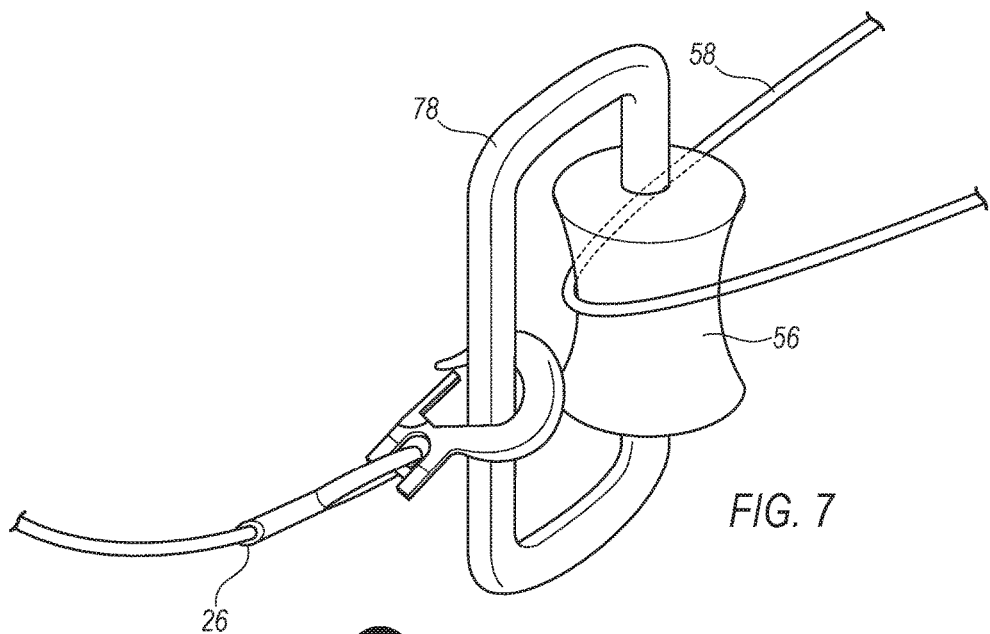
FIG. 7 is a perspective view of the diverting pulley.
Figure 8:
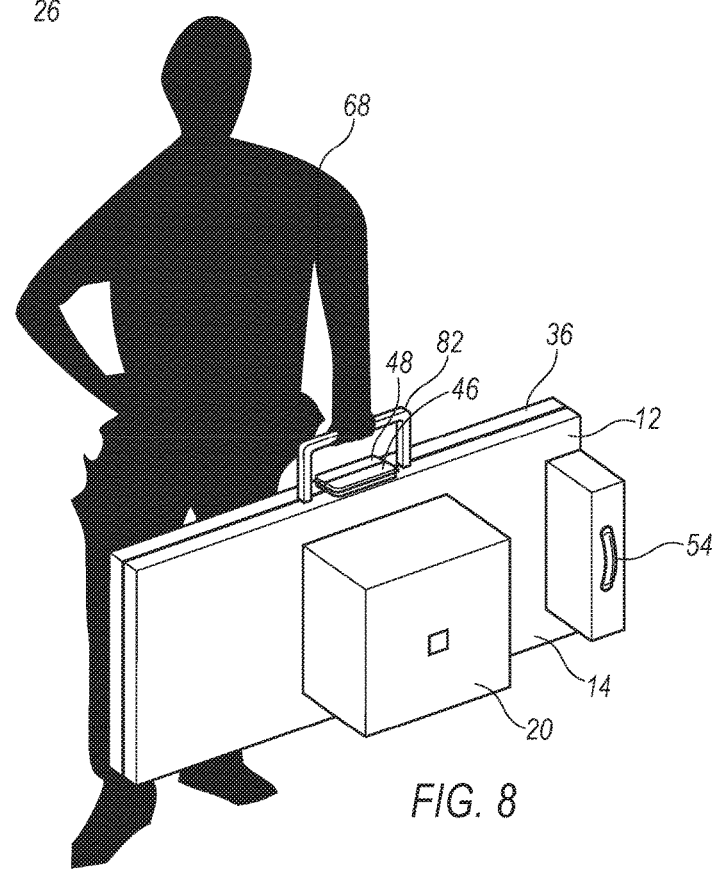
FIG. 8 is a perspective view of the base and the diverter.

As shown in FIG. 7, the base 12 may include a first latching mechanism 46 and the diverter 36 may include a second latching mechanism 48. The first latching mechanism 46 and the second latching mechanism 48 may be engageable with each other. When the first latching mechanism 46 and the second latching mechanism 48 are engaged with each other, the base 12 and the diverter 36 may be connected to each other. For example, the bottom surface 16 of the base 12 may abut the bottom surface 42 of the diverter 36. Another set of latching mechanisms may be disposed on sides of the base 12 and diverter 36 opposite the sides of the first latching mechanism 46 and second latching mechanism 48. A handle 82 may be attached to either the base 12 or the diverter 36. The handle 82 may be configured to be gripped by the operator 68.

In light of the foregoing, the operation of the carpet pulling apparatus 10 will now be described. A carpet 84 may be cut to create the strip of carpet 70. The base 12 may be set down on the carpet 84. The spikes 18 of the base 12 may grip the carpet 84, i.e., the spikes 18 may prohibit lateral movement of the base 12 with respect to the carpet 84. The diverter 36 may be set down on the carpet 84. For example, if there is an obstacle in the way, the diverter 36 may be positioned such that the carpet pulling apparatus 10 may pull the strip of carpet 70 without having to move the base 12. The spikes 44 of the diverter 36 may grip the carpet 84, i.e., the spikes 44 may prohibit lateral movement of the diverter 36 with respect to the carpet 84.

The second end 26 of the cable 22 may be extended away from the base 12 and towards the diverter 36. The cable 22 may engage and abut the diverting pulley 38, and the second end 26 of the cable 22 may extend towards the strip of carpet 70. The clamp 30 may be moved to the unlocked position. The gripping mechanism 32 of the clamp 30 may then be aligned with the strip of carpet 70. The clamp 30 may then be moved to the locked position. The gripping mechanism 32 of the clamp 30 may engage or grip the strip of carpet 70.

The winch 20 may be powered on. For example, if the winch 20 is electrical, the winch may be plugged into an electrical outlet and turned on via a button. The winch 20 may then be turned to a winding mode in which the motor rotates the drum, and the first end 24 of the cable 22 wraps around the drum. In the winding mode, the cable 22 pulls the strip of carpet 70 towards the diverter 36 and separates any bonding (e.g., glue) between the strip of carpet 70 and the floor 72.

As another example, as shown in FIG. 5, the carpet 84 may be cut into two parallel strips of carpet 70. The base 12 may be set down on the carpet 84. The spikes 18 of the base 12 may grip the carpet 84, i.e., the spikes 18 may prohibit lateral movement of the base 12 with respect to the carpet 84.

The second end 26 of the cable 22 may be extended away from the base 12 and towards the strips of carpet 70. The pulley 56 may be attached to the second end 26 of the cable 22. The second cable 58 may engage the pulley 56. The clamp 30 and the second clamp 66 may each attach to one of the strips of carpet 70, in a similar manner as described above. When the winch is turned to the winding mode, the first end 24 of the cable 22 wraps around the drum and the second end 26 of the cable 22 moves towards the base 12.

The pulley 56 pulls on the first and second ends 60, 62 of the second cable 58, and, consequently, pulls on the clamp 30 and the second clamp 66. The second cable 58 may be engaged with the pulley 56 at a location between the first end 60 and the second end 62, and a distance from the pulley 56 to the clamp 30 may not be equal to a distance from the pulley 56 to the second clamp 66. This may be, for example, because a bonding strength between the strip of carpet 70 the clamp 30 is attached to and the floor 72 is stronger or weaker than a bonding strength between the strip of carpet 70 the second clamp 66 is attached to and the floor 72.

The diverter 36 may be introduced to receive the cable 22 at a location between the first end 24 and the second end 26 and to divert the direction of extension 28. The operation of the diverter 36 may operate in a similar manner as described above.

When the carpet pulling apparatus 10 needs to be transported, the first latching mechanism 46 and the second latching mechanism 48 may be engaged with each other and the operator 68 may pick up the carpet pulling apparatus by the handle 82.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A carpet pulling apparatus, comprising:
   a base including a top surface and a bottom surface opposite the top surface;
   a winch attached to the top surface of the base;
   a cable extending from a first end to a second end, the first end being received by the winch;
   a clamp attached to the second end of the cable; and
   a diverter configured to receive the cable at a location between the first end and the second end and divert a direction of extension of the cable, wherein the diverter includes a top surface and a bottom surface opposite the top surface, the bottom surface of said diverter includes a plurality of spikes and a diverting pulley attaching to the top surface and the diverter is capable of being moved relative to the base.

2. The carpet pulling apparatus of claim 1, wherein the diverter includes a diverting pulley configured to receive the cable.

3. The carpet pulling apparatus of claim 2, wherein the top surface of the diverter is capable of receiving an operator.

4. The carpet pulling apparatus of claim 1, wherein the top surface of the base is capable of receiving an operator.

5. The carpet pulling apparatus of claim 1, wherein the bottom surface of the base includes a plurality of spikes.

6. The carpet pulling apparatus of claim 1, wherein the clamp is movable between an unlocked position and a locked position.

7. The carpet pulling apparatus of claim 1, wherein the clamp includes a gripping mechanism configured to grip a strip of carpet.

8. The carpet pulling apparatus of claim 1, wherein the base includes a first latching mechanism and the diverter includes a second latching mechanism, the first latching mechanism and the second latching mechanism being engageable with each other.

9. A carpet pulling apparatus, comprising:
a base including a top surface and a bottom surface opposite the top surface;
a winch attached to the top surface of the base;
a cable extending from a first end to a second end, the first end being received by the winch;
a pulley attached to the second end of the cable;
a second cable extending from a first end to a second end, the second cable engaging the pulley at a location between the first end and the second end of the second cable;
a clamp attached to the first end of the second cable; and
a second clamp attached to the second end of the second cable.

10. The carpet pulling apparatus of claim 9, further comprising a diverter configured to receive the cable at a location between the first end and the second end of the cable and divert a direction of extension of the cable.

11. The carpet pulling apparatus of claim 10, wherein the diverter is capable of being moved relative to the base.

12. The carpet pulling apparatus of claim 10, wherein the diverter includes a diverting pulley configured to receive the cable.

13. The carpet pulling apparatus of claim 12, wherein the diverter includes a top surface and a bottom surface opposite the top surface, the diverting pulley attaching to the top surface and the bottom surface including a plurality of spikes.

14. The carpet pulling apparatus of claim 13, wherein the top surface of the diverter is capable of receiving an operator.

15. The carpet pulling apparatus of claim 10, wherein the base includes a first latching mechanism and the diverter includes a second latching mechanism, the first latching mechanism and the second latching mechanism being engageable with each other.

16. The carpet pulling apparatus of claim 9, wherein the top surface of the base is capable of receiving an operator.

17. The carpet pulling apparatus of claim 9, wherein the bottom surface of the base includes a plurality of spikes.

18. The carpet pulling apparatus of claim 9, wherein the clamp and the second clamp are each movable between an unlocked position and a locked position.

* * * * *